(12) United States Patent
Moon

(10) Patent No.: US 12,179,687 B1
(45) Date of Patent: Dec. 31, 2024

(54) CURTAIN AIRBAG ASSEMBLY

(71) Applicant: HYUNDAI MOBIS CO., LTD., Seoul (KR)

(72) Inventor: Geon Woong Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/505,295

(22) Filed: Nov. 9, 2023

(30) Foreign Application Priority Data

Jun. 28, 2023 (KR) .......................... 10-2023-0083478

(51) Int. Cl.
*B60R 21/232* (2011.01)
*B60R 21/213* (2011.01)
*B60R 21/216* (2011.01)
*B60R 21/2338* (2011.01)

(52) U.S. Cl.
CPC .......... *B60R 21/232* (2013.01); *B60R 21/213* (2013.01); *B60R 21/216* (2013.01); *B60R 21/2338* (2013.01)

(58) Field of Classification Search
CPC .............................. B60R 21/213; B60R 21/231
See application file for complete search history.

(56) References Cited

U.S. PATENT DOCUMENTS

| | | | | |
|---|---|---|---|---|
| 7,748,734 B2 * | 7/2010 | Wilmot | ................ | B60R 21/232 280/730.2 |
| 7,762,581 B2 * | 7/2010 | Kino | ..................... | B60R 21/232 280/730.2 |
| 8,157,290 B2 * | 4/2012 | Kjell | ..................... | B60R 21/201 280/730.2 |
| 10,543,800 B2 * | 1/2020 | Kwon | ................... | B60R 21/233 |
| 11,840,192 B2 * | 12/2023 | Kang | ................ | B60R 21/23138 |
| 2002/0125705 A1 * | 9/2002 | Wong | ................... | B60R 21/2338 280/743.2 |
| 2003/0111828 A1 * | 6/2003 | Dominissini | ......... | B60R 21/232 280/730.2 |
| 2004/0212185 A1 * | 10/2004 | Daines | ................ | B60R 21/2338 280/743.2 |
| 2005/0057023 A1 * | 3/2005 | Burton | .................. | B60R 21/232 280/730.2 |
| 2005/0087960 A1 * | 4/2005 | Gammill | ............... | B60R 21/232 280/730.2 |

(Continued)

FOREIGN PATENT DOCUMENTS

| DE | 202020100026 U1 * | 3/2020 | ........... B60R 21/213 |
|---|---|---|---|
| EP | 1510416 A1 * | 3/2005 | ........... B60R 21/232 |

(Continued)

*Primary Examiner* — Nicole T Verley
(74) *Attorney, Agent, or Firm* — NovoTechIP International PLLC

(57) ABSTRACT

A curtain airbag assembly is provided which includes a curtain airbag module in which a curtain airbag cushion is fixedly folded and a twist prevention tether disposed parallel to the curtain airbag module in a longitudinal direction of the curtain airbag module. Fixing holes may be formed in front and rear ends of the curtain airbag cushion, and the twist prevention tether may be fixedly fitted into the fixing holes. The twist prevention tether is configured to be twisted when a twist occurs in the curtain airbag module to thereby to provide tension in a direction opposite to a twist direction to counteract and prevent the twist.

8 Claims, 4 Drawing Sheets

(56) References Cited

U.S. PATENT DOCUMENTS

| | | | | |
|---|---|---|---|---|
| 2005/0206135 | A1* | 9/2005 | Nelson | B60R 21/2338 280/730.2 |
| 2007/0090630 | A1* | 4/2007 | Wilmot | B60R 21/237 280/730.2 |
| 2008/0106073 | A1* | 5/2008 | Garner | B60R 21/2338 280/728.2 |
| 2009/0184494 | A1* | 7/2009 | Dominissini | B60R 21/217 280/728.2 |
| 2015/0084316 | A1* | 3/2015 | Okuhara | B60R 21/2338 280/729 |
| 2021/0107425 | A1* | 4/2021 | Choi | B60R 21/232 |

FOREIGN PATENT DOCUMENTS

| | | | | |
|---|---|---|---|---|
| JP | 2013193559 A | * | 9/2013 | |
| KR | 20230134294 A | * | 9/2023 | |
| WO | WO-2005028260 A2 | * | 3/2005 | B60R 21/213 |
| WO | WO-2008025444 A1 | * | 3/2008 | B25B 31/00 |
| WO | WO-2014129054 A1 | * | 8/2014 | B60R 21/201 |
| WO | WO-2021061244 A1 | * | 4/2021 | B60R 21/213 |

\* cited by examiner

CURTAIN AIRBAG ASSEMBLY

CROSS-REFERENCE TO RELATED APPLICATIONS

This application claims priority to and the benefit of Korean Patent Application No. 10-2023-0083478, filed on 28 Jun. 2023, the disclosure of which is incorporated herein by reference in its entirety.

TECHNICAL FIELD

The present invention relates to a curtain airbag assembly, and more specifically, to a curtain airbag assembly in which a twist occurring when a curtain airbag module is assembled with a vehicle body is prevented.

BACKGROUND

In general, a vehicle includes various airbags such as a driver airbag (DAB), a passenger airbag (PAB), a knee airbag (KAB), a curtain airbag (CAB), and a side airbag (SAG) in order to safely protect a driver and a fellow passenger (hereinafter, referred to as a passenger) when a collision or rollover accident occurs.

The CAB among these airbags is mounted on an upper portion of a pillar, a roof rail, or a ceiling or pillar of the vehicle and, when the collision or overturn accident of the vehicle occurs, the airbag is fully deployed downward from above to maintain a shape like a window curtain, and thus there is an advantage that the passenger can be more reliably protected by preventing the passenger's ejection through a window or from injury.

In the conventional curtain airbag device, an airbag cushion is folded upward through a roll folding method and fixedly coupled to a side surface of a roof of the vehicle.

The roll-folded curtain airbag is manually assembled with a housing of the vehicle. In the conventional curtain airbag, a twist of the airbag is prevented by visually checking whether the airbag is twisted using a twist prevention line. However, since the roll-folded airbag is formed of a soft material, there is a possibility of misassembly due to a force of an assembler.

When the airbag is coupled to the vehicle in a twisted state, the airbag may not be properly deployed due to a pressure generated due the twist when the airbag is deployed, and the airbag may be damaged by a high-pressure gas discharged from an inflator. Accordingly, a means for preventing incorrect assembly of the curtain airbag is necessary.

SUMMARY

The present invention is directed to providing a curtain airbag assembly in which a twist occurring when the curtain airbag module is assembled with a vehicle body is prevented.

Objectives to be solved through the present invention are not limited to the above-described objectives, and other objectives which are not described above will be clearly understood to those skilled in the art from the following description.

According to an aspect of the present invention, there is a curtain airbag assembly including a curtain airbag module in which a curtain airbag cushion is fixedly folded and a twist prevention tether disposed parallel to the curtain airbag module in a longitudinal direction.

Fixing holes may be formed in front and rear ends of the curtain airbag cushion, and the twist prevention tether may be fixedly fitted into the fixing holes, also be twisted when a twist occurs in the curtain airbag module, and provide tension in a direction opposite to a twist direction to prevent the twist.

The twist prevention tether may be fixedly sewn on the front and rear ends of the curtain airbag cushion.

The curtain airbag module may include a mounting tab coupled to the vehicle body frame and protruding in a direction perpendicular to the longitudinal direction of the curtain airbag module, a through hole through which the twist prevention tether passes may be formed in the mounting tab, and the twist prevention tether may pass through the through hole and be disposed parallel to the curtain airbag module in the longitudinal direction.

The twist prevention tether may be formed of a fabric material.

The twist prevention tether may be formed to have a smaller length than the curtain airbag module and disposed parallel to at least a portion of the curtain airbag, and the fixing holes may be formed in portions in which ends of the twist prevention tether are disposed.

The twist prevention tether may be provided as a plurality of twist prevention tethers, and the fixing holes may be formed in portions in which ends of the plurality of twist prevention tethers are disposed.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
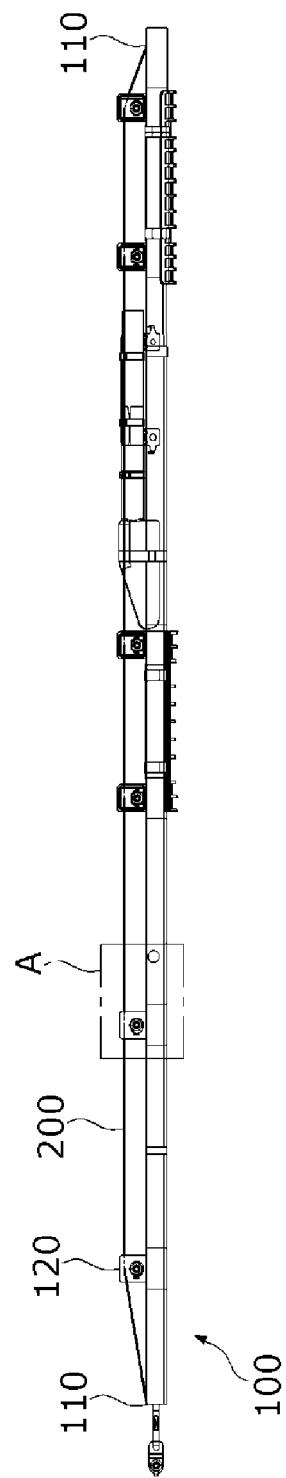
FIG. 1 is a view illustrating a curtain airbag assembly according to one embodiment of the present invention.

Since the present invention may be modified in various ways and have numerous embodiments, specific embodiments will be illustrated in the accompanying drawings and described in the detailed description. However, this is not intended to limit the present invention to the specific embodiments, and it is to be appreciated that all changes, equivalents, and substitutes falling within the spirit and technical scope of the present invention are encompassed in the present invention. In the description of the embodiments, certain detailed descriptions of the related art are omitted when it is deemed that they may unnecessarily obscure the gist of the inventive concept.

While terms such as "first" and "second" may be used to describe various components, such components are not limited by the above terms. The terms are used only to distinguish one component from another.

The terminology used herein is for the purpose of describing particular embodiments only and is not intended to limit the present invention. The singular forms are intended to include the plural forms, unless the context clearly indicates otherwise. In the present specification, it should be understood that the terms "comprise," "comprising," "include," and/or "including" used herein specify the presence of stated features, numbers, steps, operations, elements, components, and/or combinations thereof but do not preclude the presence or addition of one or more other features, numbers, steps, operations, elements, components, and/or combinations thereof.

In addition, throughout the specification, when components are "connected," this may not only mean that two or more components are directly connected, but this may also mean that two or more components are indirectly connected through other components or are physically connected as well as electrically connected, or are one thing even referred to as different names according to positions or functions thereof.

In addition, when a first element is described as being formed or disposed "on" or "under" a second element, such a description includes both a case in which the two elements are formed or disposed in direct contact with each other and a case in which one or more other elements are interposed between the two elements. In addition, when a first element is described as being formed "on or under" a second element, such a description may include a case in which the first element is formed at an upper side or a lower side with respect to the second element.

Hereinafter, embodiments of a curtain airbag assembly according to the present invention will be described in detail with reference to the accompanying drawings, and when the embodiments are described with reference the accompanying drawings, components that are the same or correspond to each other will be denoted by the same reference numerals, and redundant description will be omitted.

FIG. 1 is a view illustrating a curtain airbag assembly according to one embodiment of the present invention.

Referring to FIG. 1, the curtain airbag assembly according to one embodiment of the present invention may include a curtain airbag module 100 in which a curtain airbag cushion is fixedly folded and a twist prevention tether 200 disposed parallel to the curtain airbag module 100 in a longitudinal direction.

The curtain airbag module 100 is a module in which an airbag is folded in a roll shape and fixed using a strap or the like. The folding of the curtain airbag module 100 is automatically performed by a machine using an automated apparatus, and a process of coupling the folded curtain airbag module 100 to a vehicle body is manually performed by an operator. Since the curtain airbag module 100 is long and is attached at a position inside a vehicle frame, it is difficult for the operator to easily assemble the curtain airbag module 100.

Although a twist prevention wire may be applied to prevent a twist of the curtain airbag module 100, since the twist prevention wire is coupled inside the vehicle frame, it is difficult to visually check the twist prevention wire due to difficulty of the operator to enter the inside of the vehicle frame.

The twist prevention tether 200 of the present invention may be disposed parallel to the curtain airbag module 100 and connected to and spaced a predetermined distance from the curtain airbag module 100. The twist prevention tether 200 may be connected to front and rear ends of the curtain airbag module 100, and a length of the twist prevention tether 200 may be formed to correspond to a length of the curtain airbag module 100 so that the twist prevention tether 200 may be disposed to apply tension to the curtain airbag module 100. That is, the twist prevention tether 200 may be disposed to be connected to the curtain airbag module 100 without any remaining portion to maintain a tight state and may be formed so that tension is applied even when a twist occurs slightly.

When the curtain airbag module 100 is twisted, the twist prevention tether 200 may be twisted together with the curtain airbag module 100 to provide tension in a direction opposite to a twist direction so as to counteract and thereby prevent a twist. In addition, when a twist occurs, at least a portion of the twist prevention tether 200 may surround the curtain airbag module 100 and may be disposed not parallel to the curtain airbag module 100, and thus the twist can be clearly determined visually.

Both ends of the twist prevention tether 200 may be coupled to the front and rear ends of the curtain airbag module 100. Fixing holes 110 may be formed in the front and rear ends of the curtain airbag module 100 so that the twist prevention tether 200 is fixed to the corresponding fixing holes 110. A method of fixing the twist prevention tether 200 in the fixing holes 110 is not limited, and the twist prevention tether 200 may be fixed through a method that the twist prevention tether 200 passes through the corresponding fixing holes 110 and is sewn on the curtain airbag module 100.

The twist prevention tether 200 may be formed of fabric. Even when the twist prevention tether 200 is not formed of fabric, a material of the twist prevention tether 200 is not limited as long as the length of the twist prevention tether 200 can be reduced to generate tension when a twist occurs. When the twist prevention tether 200 is formed of the fabric, since there is little elasticity, a twist can be easily prevented.

Figure 2:
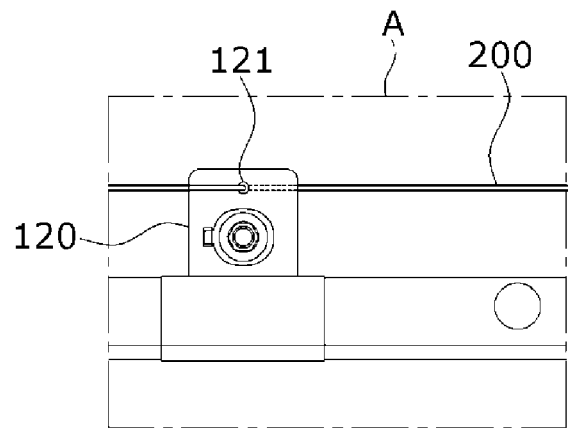
FIG. 2 is a view illustrating a mounting tab of the curtain airbag assembly according to one embodiment of the present invention.

FIG. 2 is a view illustrating a mounting tab of the curtain airbag assembly according to one embodiment of the present invention.

Referring to FIG. 2, a through hole 121 through which the twist prevention tether 200 may pass may be formed in a mounting tab 120 of the curtain airbag assembly according to one embodiment of the present invention. Since the twist prevention tether 200 is disposed parallel to and spaced a predetermined distance from the curtain airbag module 100, the twist prevention tether 200 may be hung by passing through the through hole 121 formed in the mounting tab 120.

The through hole 121 is formed in the mounting tab 120 in addition to a hole coupled to a vehicle body frame using separate hardware. The twist prevention tether 200 may pass through all through holes 121 of a plurality of mounting tabs 120 provided in the curtain airbag module 100 and may be coupled to the curtain airbag module 100.

In order for the twist prevention tether 200 to be disposed parallel to the curtain airbag module 100, each of the through holes 121 may be formed at the same position on one of the mounting tabs 120, or at the same distance from one of the mounting tabs 120 with respect to a longitudinal axis of the curtain airbag module 100.

Figure 3:
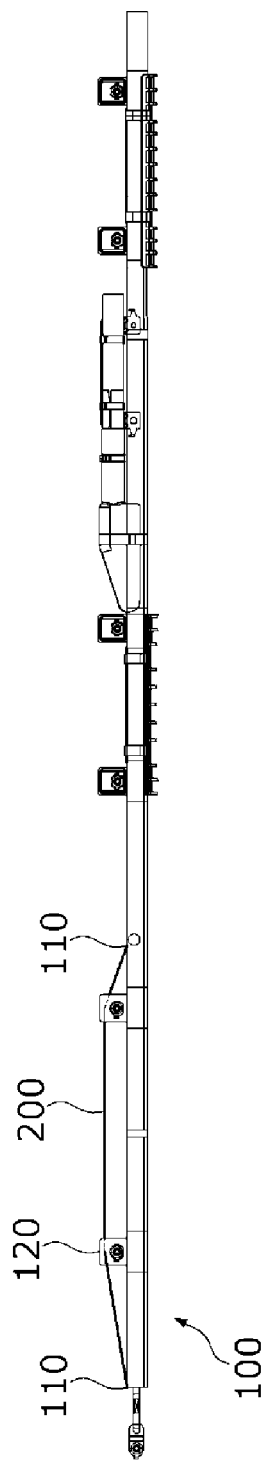
FIG. 3 is a view illustrating a curtain airbag assembly according to another embodiment of the present invention.

FIG. 3 is a view illustrating a curtain airbag assembly according to another embodiment of the present invention.

Referring to FIG. 3, a curtain airbag assembly according to another embodiment of the present invention may be formed to have a smaller length than a curtain airbag module 100. In this case, a twist prevention tether 200 may be disposed on at least a portion of the curtain airbag module 100 to prevent a twist. The portion in which the twist prevention tether 200 is disposed may be a portion, in which a twist needs to be prevented particularly, such as a portion in which a twist occurs frequently. In the present embodiment, the twist prevention tether 200 is disposed in the front of the curtain airbag module 100, and may also be disposed in a center or rear of the curtain airbag module 100.

Since the twist prevention tether 200 is formed to have the smaller length than the curtain airbag module 100, fixing holes 110 may be formed in portions in which both ends of the twist prevention tether 200 are disposed to couple the twist prevention tether 200 and the curtain airbag module 100. The twist prevention tether 200 may be coupled to the curtain airbag module 100 through a method of being sewn into the fixing holes 110. The twist prevention tether 200 may be disposed parallel to the curtain airbag module 100 by passing through a through hole 121 of a mounting tab 120 disposed in a portion in which the twist prevention tether 200 is disposed.

Figure 4:
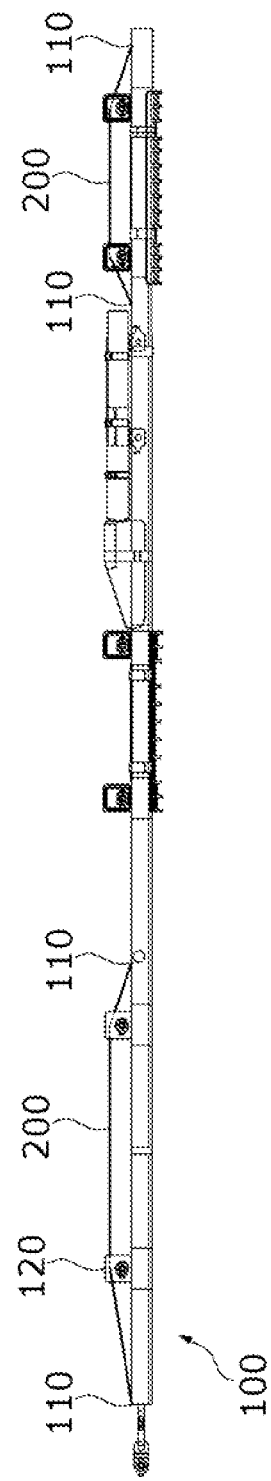
FIG. 4 is a view illustrating a curtain airbag assembly according to still another embodiment of the present invention.

FIG. 4 is a view illustrating a curtain airbag assembly according to still another embodiment of the present invention.

Referring to FIG. 4, a plurality of twist prevention tethers 200 may be formed. As illustrated in FIG. 3, each of the twist prevention tethers 200 may be formed to have a smaller length than a curtain airbag module 100 and disposed in a portion to prevent a twist. Portions in which the plurality of twist prevention tethers 200 are disposed may be portions in which twists occur frequently when the curtain airbag module 100 is assembled with a vehicle body.

In the present embodiment, each of two twist prevention tethers 200 is disposed on one of the front and a rear of the curtain airbag module 100. However, positions of the twist prevention tethers 200 are not limited, positions at which the twist prevention tethers 200 are disposed may overlap.

According to one embodiment of the present invention, when a curtain airbag module is mounted on a vehicle body, in a case in which the curtain airbag module is twisted, a twist prevention tether provides tension in a direction opposite to a twist direction to prevent a twist.

Various useful advantages and effects of the present invention are not limited to the above-described content, and might have been more easily understood through the description of specific embodiments of the present invention.

While the present invention has been described above with reference to exemplary embodiments, it may be understood by those skilled in the art that various modifications and changes of the present invention may be made within a range not departing from the spirit and scope of the present invention defined by the appended claims.

What is claimed is:

1. A curtain airbag assembly comprising:
   a curtain airbag module in which a curtain airbag cushion is fixedly folded; and
   a twist prevention tether disposed parallel to the curtain airbag module in a longitudinal direction of the curtain airbag module; and
   a front end and a rear end of the curtain airbag cushion containing fixing holes,
   wherein:
   the twist prevention tether passes through the fixing holes at the front end and the rear end of the curtain airbag cushion and is then fixed to the curtain airbag module at the front end and the rear end of the curtain airbag cushion, and
   the twist prevention tether is configured to be twisted when a twist of the curtain airbag module occurs in a twist direction to provide tension in a direction opposite to that of the twist direction to prevent the twist.

2. The curtain airbag assembly of claim 1, wherein the twist prevention tether is fixed to the curtain airbag module by being sewn to the curtain airbag module at the front and rear ends of the curtain airbag cushion.

3. The curtain airbag assembly of claim 2, wherein:
   the curtain airbag module includes a mounting tab coupled to a vehicle body frame on which the curtain airbag assembly is mounted and protruding in a direction perpendicular to the longitudinal direction of the curtain airbag module;
   the mounting tab contains a through-hole configured for the twist prevention tether to pass therethrough; and
   the twist prevention tether is configured to be passed through the through-hole parallel to the curtain airbag module in the longitudinal direction.

4. The curtain airbag assembly of claim 3, wherein the twist prevention tether is formed of a fabric material.

5. The curtain airbag assembly of claim 1, wherein:
   the twist prevention tether is formed to have a length smaller than, and is disposed parallel to, at least a portion of the curtain airbag module; and
   the fixing holes are formed in portions of the curtain airbag cushion in which ends of the twist prevention tether are disposed.

6. The curtain airbag assembly of claim 5, wherein:
   the twist prevention tether is one of a plurality of twist prevention tethers; and
   the fixing holes are formed in portions of the curtain airbag module in which ends of the plurality of twist prevention tethers are disposed.

7. The curtain airbag assembly of claim 1, wherein:
   the curtain airbag module includes a first mounting tab, adjacent to the front end of the curtain airbag cushion and coupled to a vehicle body frame on which the curtain airbag assembly is mounted and protruding in a direction perpendicular to the longitudinal direction of the curtain airbag module;
   the curtain airbag module includes a second mounting tab, adjacent to the rear end of the curtain airbag cushion and coupled to the vehicle body frame on which the curtain airbag assembly is mounted and protruding in the direction perpendicular to the longitudinal direction of the curtain airbag module;
   the first mounting tab contains a first through-hole configured for the twist prevention tether to pass therethrough;
   the second mounting tab contains a second through-hole configured for the twist prevention tether to pass therethrough;
   the twist prevention tether is configured to be passed through the first through-hole parallel to the curtain airbag module in the longitudinal direction and to extend from the first through-hole to pass through the fixing hole in the front end of the curtain airbag cushion and to be fixed to the curtain airbag module at the front end of the curtain airbag cushion; and
   the twist prevention tether is configured to be passed through the second through-hole parallel to the curtain airbag module in the longitudinal direction and to extend from the second through-hole to pass through the fixing hole in the rear end of the curtain airbag cushion and to be fixed to the curtain airbag module at the rear end of the curtain airbag cushion.

8. The curtain airbag assembly of claim 7, wherein the twist prevention tether is spaced apart from the curtain airbag module at a location between the first and second mounting tabs.

* * * * *